US009970380B2

United States Patent
Fujita

(10) Patent No.: US 9,970,380 B2
(45) Date of Patent: May 15, 2018

(54) FUEL INJECTOR DRIVER FOR COLD START OF HIGH RESISTANCE INJECTOR

(71) Applicant: DELPHI TECHNOLOGIES IP LIMITED, St. Michael (BB)

(72) Inventor: Mahoro M. Fujita, Fairport, NY (US)

(73) Assignee: DELPHI TECHNOLOGIES IP LIMITED (BB)

( * ) Notice: Subject to any disclaimer, the term of this patent is extended or adjusted under 35 U.S.C. 154(b) by 0 days. days.

(21) Appl. No.: 14/967,893

(22) Filed: Dec. 14, 2015

(65) Prior Publication Data

US 2017/0167428 A1   Jun. 15, 2017

(51) Int. Cl.
| | | |
|---|---|---|
| F02D 41/30 | (2006.01) | |
| F02D 41/34 | (2006.01) | |
| F02D 33/00 | (2006.01) | |
| F02M 51/06 | (2006.01) | |

(52) U.S. Cl.
CPC .......... *F02D 41/34* (2013.01); *F02D 33/006* (2013.01); *F02M 51/06* (2013.01); *F02D 2200/021* (2013.01)

(58) Field of Classification Search
CPC .. F02D 41/34; F02D 33/006; F02D 2200/021; F02D 2041/2065; F02D 35/025; F02M 51/06
USPC ......... 123/435, 490, 491; 701/103–105, 111, 701/113
See application file for complete search history.

(56) References Cited

U.S. PATENT DOCUMENTS

| | | | | |
|---|---|---|---|---|
| 4,511,945 A | * | 4/1985 | Nielsen ................... | F02D 41/20 123/490 |
| 4,688,138 A | * | 8/1987 | Nagata ................... | F02D 41/20 123/490 |
| 5,632,250 A | * | 5/1997 | Kato ................... | F02D 41/0027 123/198 DB |
| 5,709,193 A | * | 1/1998 | Svensson .............. | F02D 31/007 123/333 |
| 5,947,090 A | * | 9/1999 | Maeda ................... | F02D 41/20 123/490 |
| 6,657,846 B1 | * | 12/2003 | Philipp ................... | F02D 41/20 123/490 |
| 8,046,157 B2 | * | 10/2011 | Aspelmayr ............. | F02D 41/20 123/480 |
| 8,087,400 B2 | * | 1/2012 | Achleitner .............. | F02D 41/20 123/445 |
| 8,807,120 B2 | * | 8/2014 | Beer ....................... | F02D 41/20 123/472 |

* cited by examiner

*Primary Examiner* — Hai Huynh
(74) *Attorney, Agent, or Firm* — Joshua M. Haines

(57) ABSTRACT

An engine control system includes a fuel injector and a sensor that is configured to provide a signal indicative of a temperature. A controller is in communication with the sensor. The controller includes a fuel injector driver in communication with the fuel injector. The fuel injector driver includes a saturated mode and a peak and hold mode. The controller is configured to command the fuel injector driver to control the fuel injector with one of the saturated mode or the peak and hold mode based upon the signal. For a high resistance injector, the peak and hold mode is used in cold weather conditions to break free an injector seal, and then the fuel injector driver reverts to the saturated mode.

17 Claims, 4 Drawing Sheets

FUEL INJECTOR DRIVER FOR COLD START OF HIGH RESISTANCE INJECTOR

BACKGROUND

This disclosure relates to a control system and fuel injector driver suitable for use with high resistance injectors in cold weather applications.

There are various types of fuel injectors used for different fuel sources, for example. One type of fuel injector is a "low" resistance injector typically used in direct injection gasoline internal combustion engine applications. This injector is driven by a peak and hold fuel injector driver that applies a relatively high current to quickly open the injector using an actuation coil that generates a magnetic field used to open a valve assembly. This current is held for a desired duration to deliver a desired quantity of fuel. Due to the relatively low resistance of injectors, for example, 1-3 ohms, the actuation coil is capable of handling the high current for the duration of the activation.

Fuel injectors for applications such as compressed natural gas (CNG) typically have a relatively "high" resistance, for example, 7-16 ohms. This type of injector is operated using a saturated switch fuel injector driver in which a relatively low current is applied to the actuation coil of the fuel injector. The high resistance injector opens relatively slowly, but operates much cooler due to the lower current.

SUMMARY

In one exemplary embodiment, an engine control system includes a fuel injector; a sensor configured to provide a signal indicative of a temperature; and a controller in communication with the sensor, the controller includes a fuel injector driver in communication with the fuel injector, the fuel injector driver includes a saturated mode and a peak and hold mode, the controller configured to command the fuel injector driver to control the fuel injector with one of the saturated mode or the peak and hold mode based upon the signal.

In a further embodiment, a method of controlling a fuel injector includes operating a fuel injector in one of a saturated mode or a peak and hold mode based upon a temperature.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
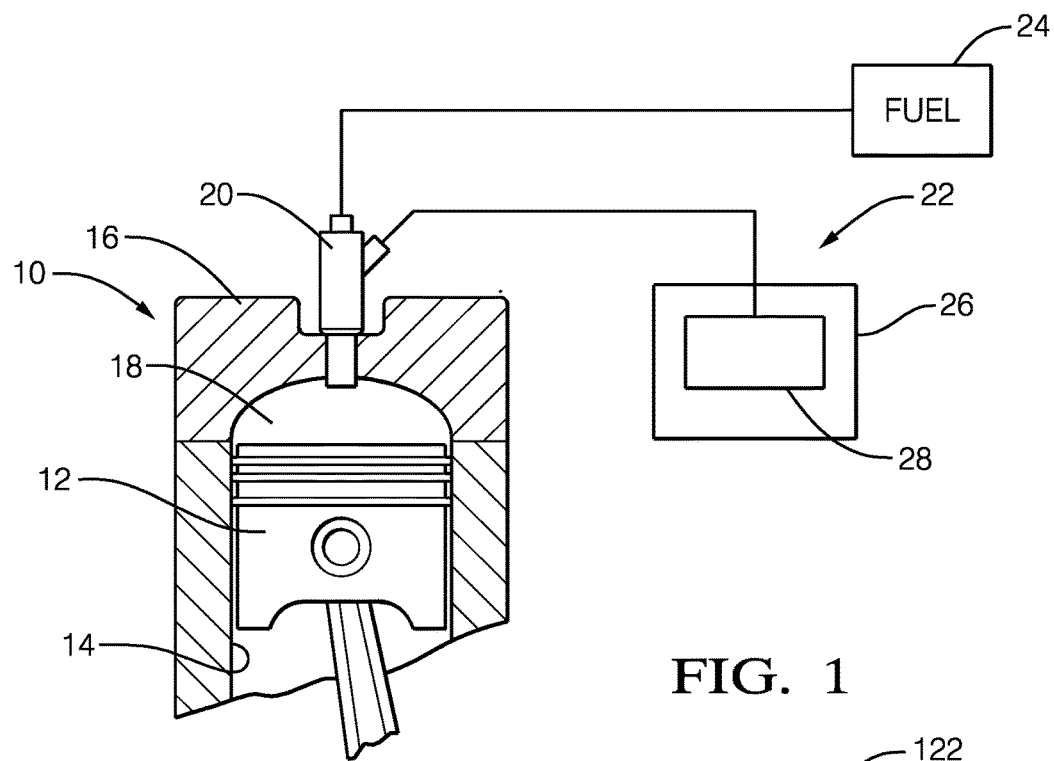
FIG. 1 is a schematic view of an engine and control system for use with a single fuel source.

An example of an internal combustion engine with a single fuel system is illustrated in FIG. 1 in a highly schematic manner. An engine 10 includes a piston 12 arranged within a cylinder 14. A head 16 is secured over the cylinder 14 to provide a combustion chamber 18. A fuel injector 20 is mounted in the head 16 and is configured to deliver fuel to the combustion chamber 18 during the combustion cycle. A control system 22 includes a controller 26 having a fuel injector driver 28 that communicates with the fuel injector 20 to deliver fuel from a fuel source 24, for example, compressed natural gas (CNG), in the amount desired.

Figures 2A, 2B:
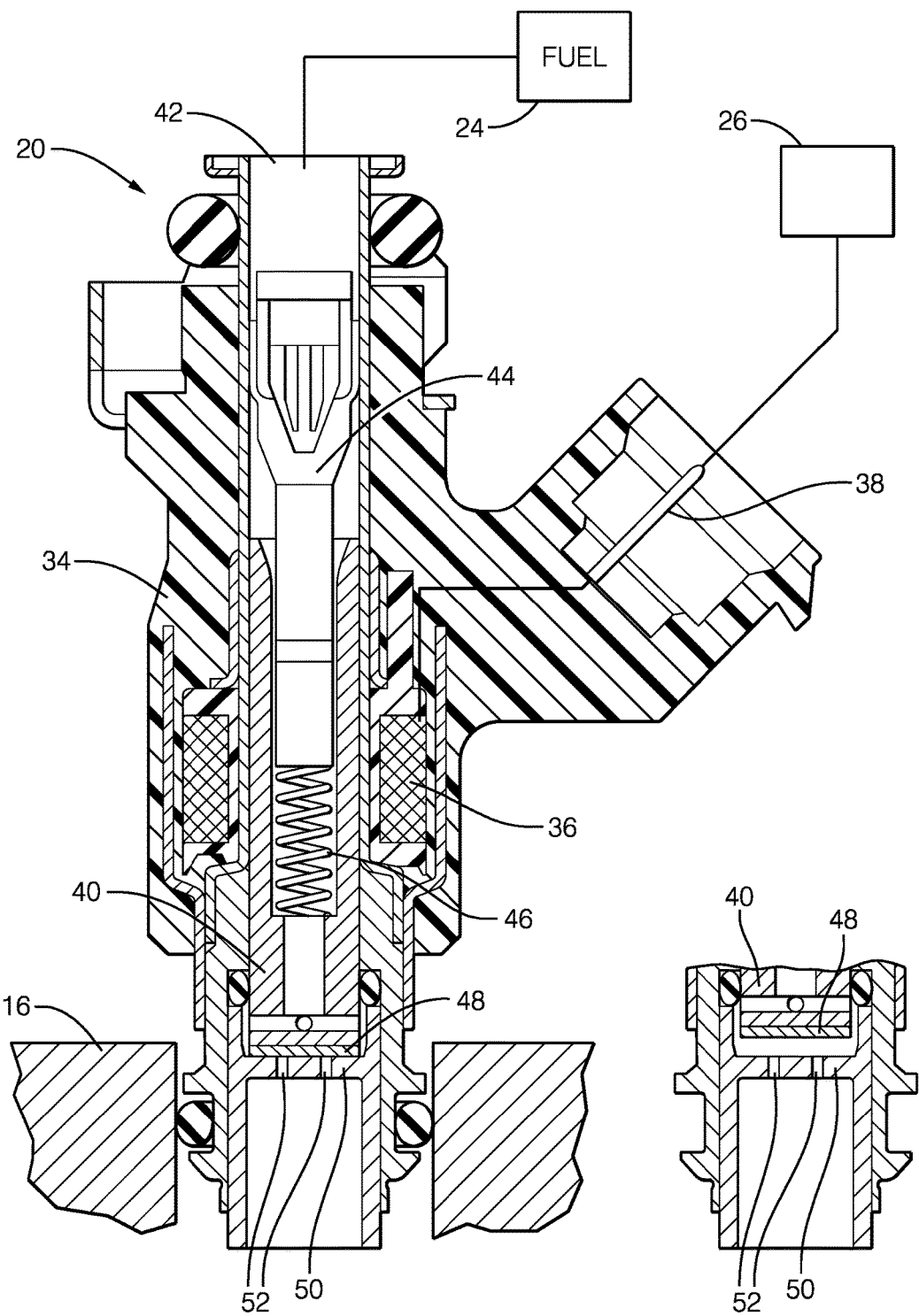
FIG. 2A is a cross-sectional view of an example gaseous fuel injector in a closed position.
FIG. 2B is a partial cross-sectional view of the fuel injector shown in FIG. 2A but in an open position.

One type of gaseous fuel injector is illustrated in FIGS. 2A and 2B. The fuel injector 20 includes a body 34 having an actuation coil 36 that communicates with the fuel injector driver 26 via an electrical connector 38. The actuation coil 36 is operated to selectively generate a magnetic field, which is used to move a valve assembly 40 linearly within a fuel tube 42 and open the fuel injector to permit the flow of fuel.

A calibration tube 44 is fixed within the fuel tube 42. A spring 46 is arranged between the calibration tube 44 and the valve assembly 40 to bias a seal 48 supported on an end of the valve assembly 40 against a seat 50 in a closed position (FIG. 2A). The seat 50 is constructed from an elastomeric material and blocks holes 52 in the seat 50 in the closed position.

When the fuel injector 20 receives an electrical signal from the fuel injector driver 28, the actuation coil 36 generates a magnetic field about the valve assembly 40 to move the valve assembly 40 and the associated seal 48 out of engagement with the seat 50 (FIG. 2B) and permit the flow of fuel through the holes 52. When current to the actuation coil 36 ceases or drops below a threshold, the magnetic coil diminishes to a point where the spring 46 returns the valve assembly 40 to the closed position (FIG. 2A).

Figure 3:
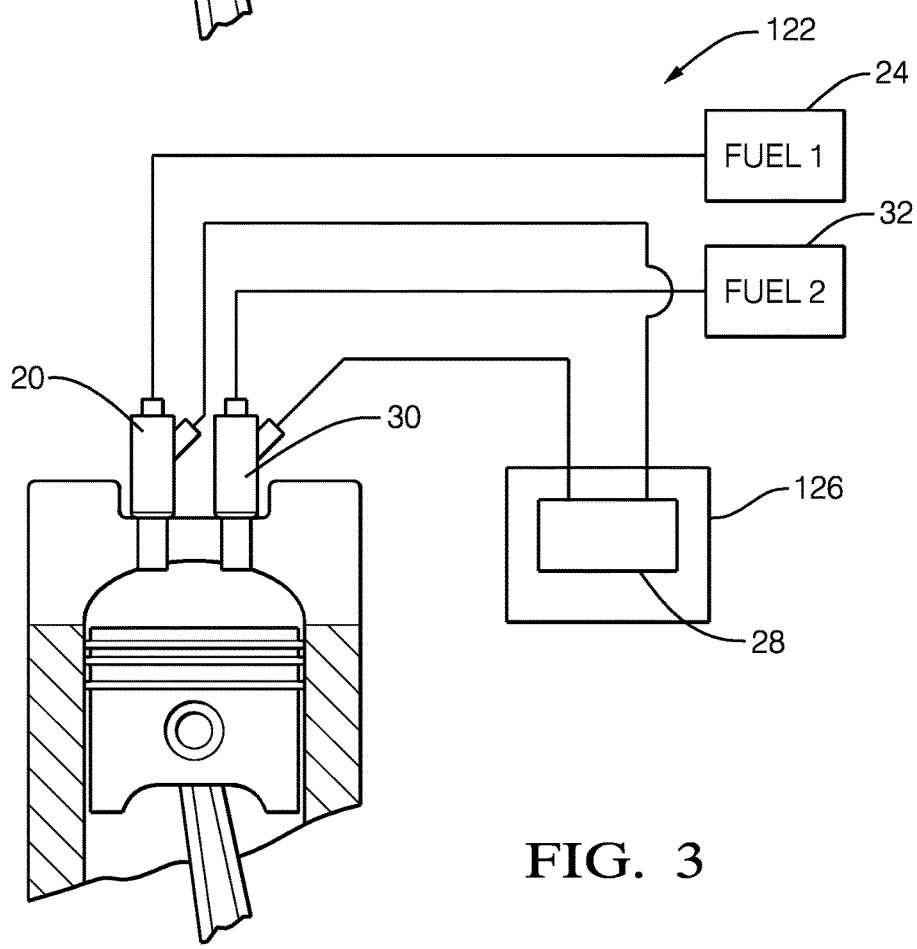
FIG. 3 is a schematic view of an engine and control system for a dual fuel system.

FIG. 3 schematically illustrates a dual fuel system in which a second fuel source 32, which may include liquid fuel such as gasoline, is supplied to a second fuel injector 30 having a low resistance. Both the first and second fuel injectors 20, 30 are mounted in the head or intake manifold and operated by a common fuel injector driver 28 of the controller 126.

During cold weather operating conditions, the seal 48 may become sticky making it more difficult to overcome this adhesion (in addition to the spring force) and open the valve assembly 40. This may be particularly problematic for high resistance fuel injectors used in, for example, CNG applications, as a relatively low current is provided by these saturated driven fuel injectors. To this end, the fuel injectors may be initially operated in a peak and hold mode to unstick the seal 48 from the seat 50 and then subsequently operated in a saturated mode so that the actuation coil 36 does not overheat and short.

Figure 4:
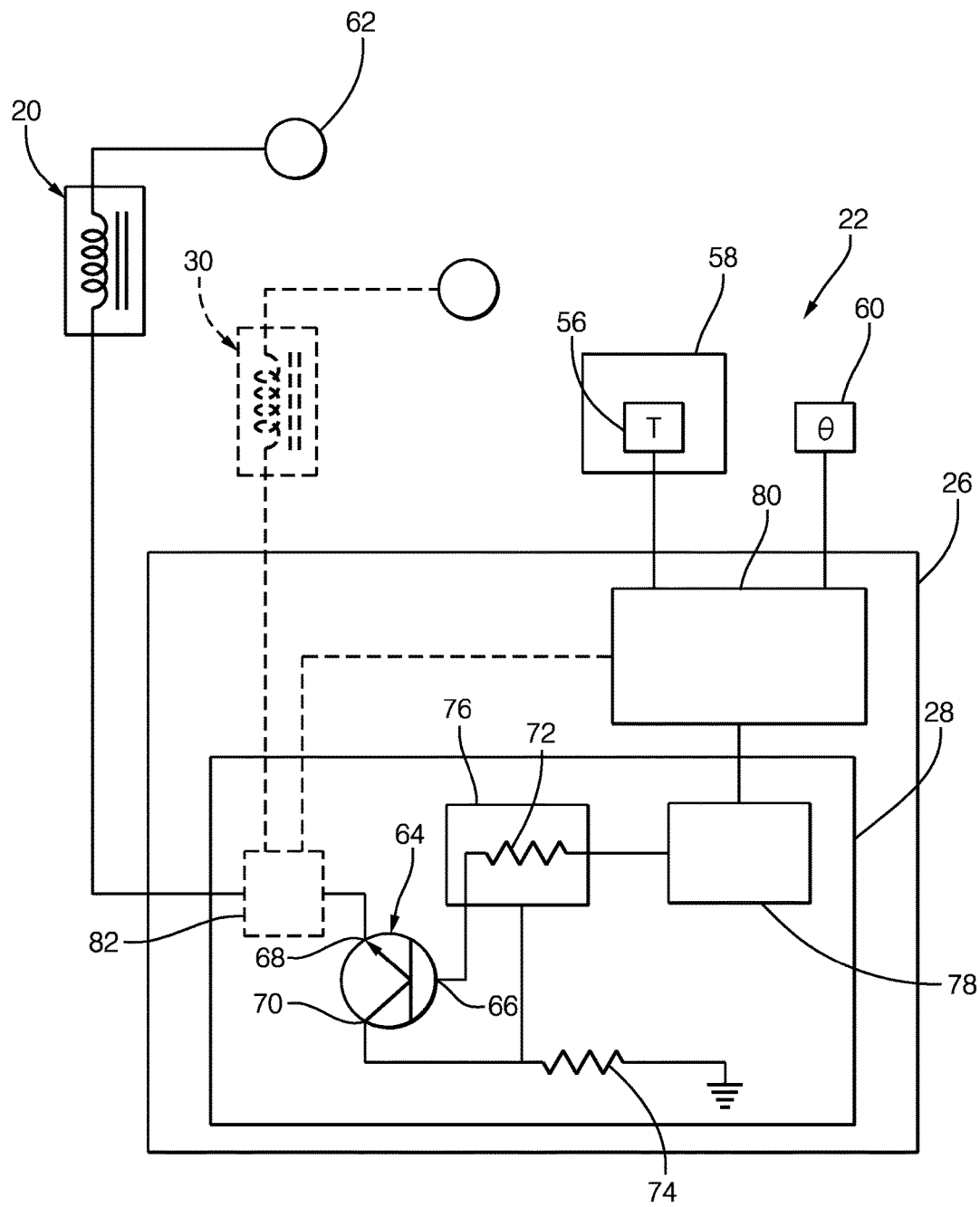
FIG. 4 is an example schematic of a controller and a fuel injector driver for one or more fuel injectors.

As shown in FIG. 4, the controller 26 has a fuel injector driver 28 that includes peak and hold circuitry that supports both a peak and hold mode and a saturated mode. A sensor 56, such as a temperature sensor for a coolant system 58, communicates with the controller 26. The sensor 56 need not be a coolant temperature sensor, and may be any sensor or algorithm that is indicative of a cold start or cold weather condition typically associated with a sticky fuel injector seal. A crank angle sensor 60 may also provide the angular position of the engine's crank shaft to enable the controller 26 to determine the position of the piston 12 relative to the combustion cycle so that the delivery of fuel from the fuel injector 20 may be timed appropriately.

Battery voltage is applied to a terminal 62 (38) of the fuel injector 20, which is a high resistance injector, that is, a fuel injector with an actuation coil having a resistance of 8-20Ω, and in one example 12-16Ω. A command signal is provided by the controller 26 to selectively open and close the fuel injector 20.

The fuel injector driver 28 includes a transistor 64 having a base 66, a collector 68 and an emitter 70. When operating in peak and hold mode, a first logic circuit 76 relays a logic high signal from a second logic circuit 78 to the base 66, which causes the collector 68 to short to the emitter 70 when fully saturated. The second logic circuit 78 generates the logic high signal in response to a command from the third logic circuit 80, which contains the control logic for desired control of the fuel injector based upon engine operating conditions and environment. A first resistor 72 is provided in series with the emitter 70 to allow for a voltage drop, which is proportional to the current through the fuel injector. This current is monitored by the first logic circuit 76. When the first logic circuit 76 measures a threshold voltage drop, it is assumed that the peak current has been reached and the fuel injector is fully open. Subsequently, a smaller current is needed to hold the fuel injector open.

When operating in saturated mode, the first logic circuit 76 relays a logic high signal from the second logic circuit 78 to the base 66, which causes the collector 68 to short to the emitter 70 when fully saturated, thus opening the fuel injector. At the end of the pulse, the second logic circuit 78 provides a low logic signal to the base 66, which opens the collector and closes the fuel injector.

The second injector 30, which may be a low resistance fuel injector, may be actuated by the same fuel injector driver 28. The low resistance injector has an actuation coil with a resistance less than 7Ω, and in one example 1-3Ω. A switch 82 is commanded by a third logic circuit 80 and is used to switch between the first and second fuel injectors 20, 30 depending on which fuel is being delivered to the combustion chamber 18. The second injector 30 is typically operated in peak and hold mode due to its low resistance actuation coil.

Figure 5:
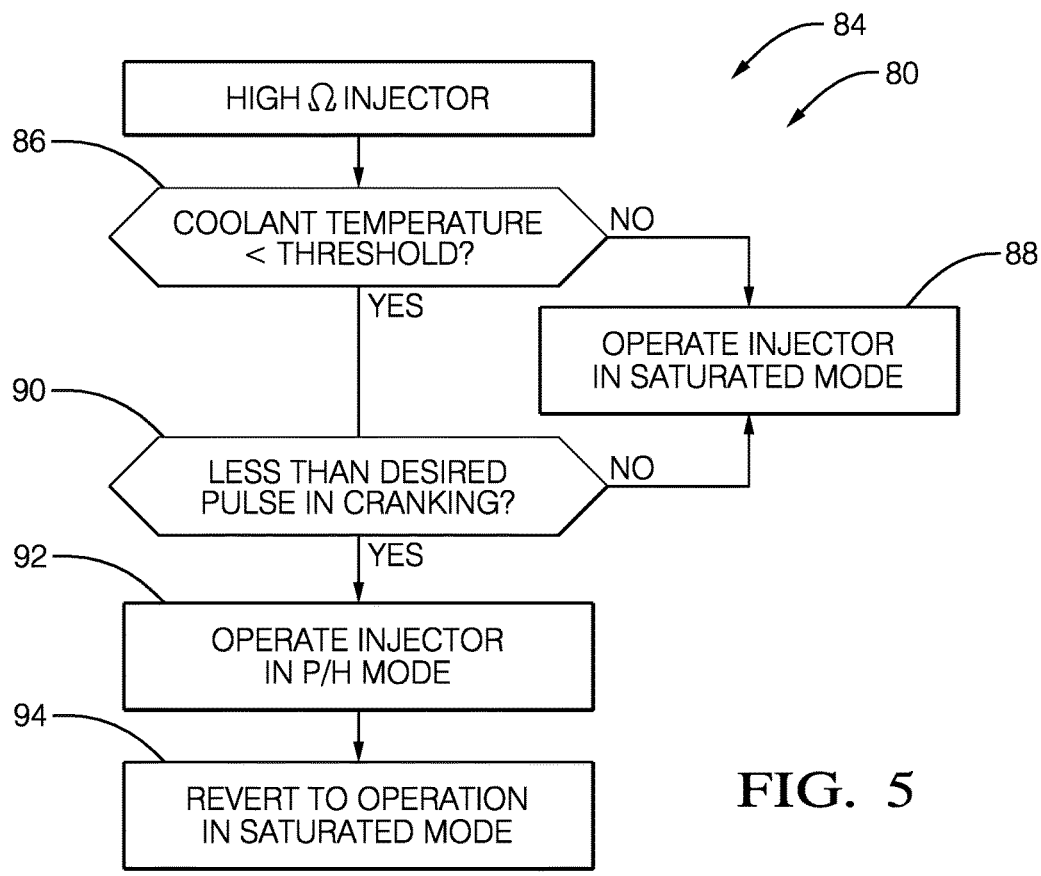
FIG. 5 is a method illustrating a flow chart for control logic used in operating fuel injector.

A method 84 of controlling the fuel injector 20 within the controller 26 is illustrated in FIG. 5. For a high resistance injector, the controller 26 determines whether there is a cold weather condition that is likely to result in a stuck seal. For example, if the coolant temperature is less than a threshold temperature (block 86), then the controller determines if there are less than a desired number of pulses in cranking (block 90). In one example, the threshold temperature is 0°, and the desired number of pulses is three per injector. If neither is the case, then the fuel injector is operated in saturated mode (block 88); otherwise, the fuel injector is operated in peak and hold mode (block 92) to unstick the seal from the seat with high open force. Once the seal has been unstuck, typically after three peak and hold pulses, the controller 26 reverts to operating the fuel injector in saturated mode to avoid damaging the actuation coil by heat generated with high current (block 94).

Figure 6:
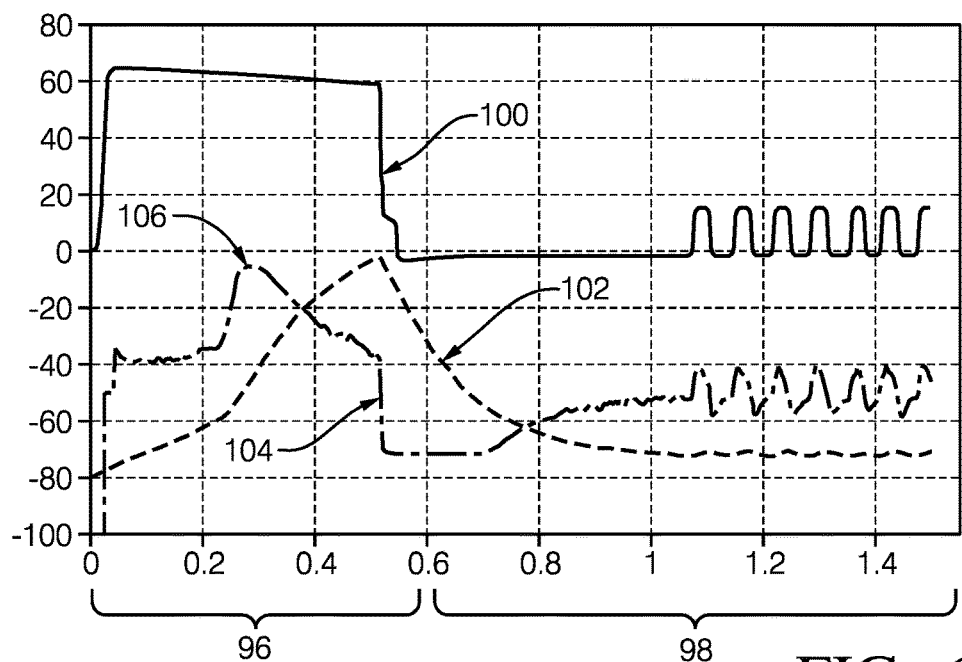
FIG. 6 is a chart illustrating voltage, current and a change in current over time for the fuel injector driver shown in FIG. 4.

The command signal provided by the controller 26 to the fuel injector is shown graphically in FIG. 6. The peak period is shown at 96, and the subsequent holding period is shown at 98. The curve 100 indicates the voltage, and the curve 102 indicates the voltage. Curve 104 is the change in current over time. The duration of voltage hold is approximately double the time that it takes for the current to peak, indicating the fuel injector opening point 106. In one example, the peak duration is 0.5 ms. The peak voltage is about 65V in one example, and the hold voltage is set to the equivalent of 5.8V at the fuel injector.

It should be noted that a controller 26 can be used to implement the various functionality disclosed in this application. The controller 26 may include one or more discrete units. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 26 may be a hardware device for executing software, particularly software stored in memory. The controller 26 can be a custom made or commercially available processor, a central processing unit (CPU), an auxiliary processor among several processors associated with the controller, a semiconductor-based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. The memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

When the controller 26 is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An engine control system comprising:
   a fuel injector;
   a sensor configured to provide a signal indicative of a temperature;
   a controller in communication with the sensor, the controller includes a fuel injector driver in communication with the fuel injector, the fuel injector driver includes a saturated mode and a peak and hold mode, the controller configured to command the fuel injector driver to control the fuel injector with one of the saturated mode or the peak and hold mode based upon the signal;
   a crank angle sensor in communication with the controller and configured to detect a number crank pulses;
   wherein the controller is configured to command the fuel injector driver to operate the fuel injector in the peak and hold mode if the engine temperature is below a threshold temperature; and
   wherein the controller is configured to command the fuel injector driver to operate the fuel injector in the peak and hold mode if the number of crank pulses during a cold start is below a predetermined number.

2. The engine control system according to claim 1, wherein the fuel injector includes an actuation coil surrounding a valve assembly, an elastomeric seal is secured to the valve assembly and abuts a seat in a closed position, the actuation coil configured to move the valve assembly and elastomeric seal from the closed position to an open position in response to fuel injector driver.

3. The engine control system according to claim 2, wherein the actuation coil has a resistance of greater than 7 ohms.

4. The engine control system according to claim 3, wherein the actuation coil has a resistance in a range of 12-16 ohms.

5. The engine control system according to claim 1, wherein the sensor is a temperature sensor.

6. The engine control system according to claim 5, comprising a cooling system, wherein the temperature sensor is provided in the cooling system, and the temperature is a coolant temperature within the cooling system.

7. The engine control system according to claim 1, wherein the threshold temperature is 0° C.

8. The engine control system according to claim 1, wherein the controller is configured to command the fuel injector driver to revert to operate the fuel injector in the saturated mode after a predetermined number of the cycle with the peak and hold mode.

9. The engine control system according to claim 8, wherein fuel injector is configured to move from a closed position to an open position, and the predetermined peak time corresponds to approximately twice the time it takes for the fuel injector to move from the closed position to the open position in response to the peak and hold mode.

10. The engine control system according to claim 1, comprising a combustion chamber and a first fuel injector, wherein the fuel injector is a second fuel injector, the first and second fuel injectors respectively include resistances in a range of 0-7 ohms and 8-20 ohms, the fuel injector driver in communication with the first and second fuel injectors and configured to selectively operate one of the first and second fuel injectors based upon one of at least two fuel sources.

11. A method of controlling a fuel injector comprising the steps of:
   operating a fuel injector in one of a saturated mode or a peak and hold mode based upon a temperature and a number of crank pulses detected by a crank angle sensor.

12. The method according to claim 11, wherein the operating step includes operating the fuel injector in a peak and hold mode during a cold start condition in which the temperature is below a threshold temperature.

13. The method according to claim 12, wherein the operating step includes reverting to operating the fuel injector in the saturated mode after a predetermined hold time during the peak and hold mode.

14. The method according to claim 12, wherein the peak and hold mode fuel injector operating step includes breaking an injector seal away from a seat.

15. The method according to claim 12, wherein the fuel injector has an actuator coil with a resistance in a range of 7-16 ohms.

16. The method according to claim 11, wherein the peak and hold mode fuel injector operating step and the saturated mode fuel injector operating step are performed using the same fuel injector driver.

17. The method according to claim 16, comprising the step of operating a low resistance fuel injector with the fuel injector driver in the peak and hold mode when using a first fuel, and comprising the step of operating a high resistance fuel injector driver with the same fuel injector driver in one of a saturated mode or a peak and hold mode based upon a temperature when using a second fuel.

* * * * *